United States Patent [19]
Bias

[11] 3,768,511
[45] Oct. 30, 1973

[54] CONTROL DEVICE

[76] Inventor: Sydney C. Bias, 140 Crooked Creek Rd., Putnam, W. Va.

[22] Filed: Nov. 15, 1971

[21] Appl. No.: 198,700

[52] U.S. Cl. .................................. 137/597, 73/211
[51] Int. Cl. ............................................ F16k 11/10
[58] Field of Search .................... 73/211, 212, 213; 137/597

[56] References Cited
UNITED STATES PATENTS

| | | | |
|---|---|---|---|
| 3,596,680 | 8/1971 | Adams | 137/597 X |
| 2,871,881 | 2/1959 | Hewson | 137/597 |
| 2,441,483 | 5/1948 | Goehring | 137/597 |

Primary Examiner—Robert G. Nilson
Attorney—Edward G. Atkins

[57] ABSTRACT

A control device has been designed for combination with a process orifice and a pressure differential measuring instrument device. This device, which is inexpensive and easy to replace, combines the advantage of protecting the instrument device and also facilitates the clearing of process material from orifice leads when an unbalanced condition occurs in the process. This control device, sometimes referred to as an instrument manifold, consists of a housing containing a series of passages and valves and which uniquely adapts instrument operating fluid to the purpose for which the control device was designed.

11 Claims, 7 Drawing Figures

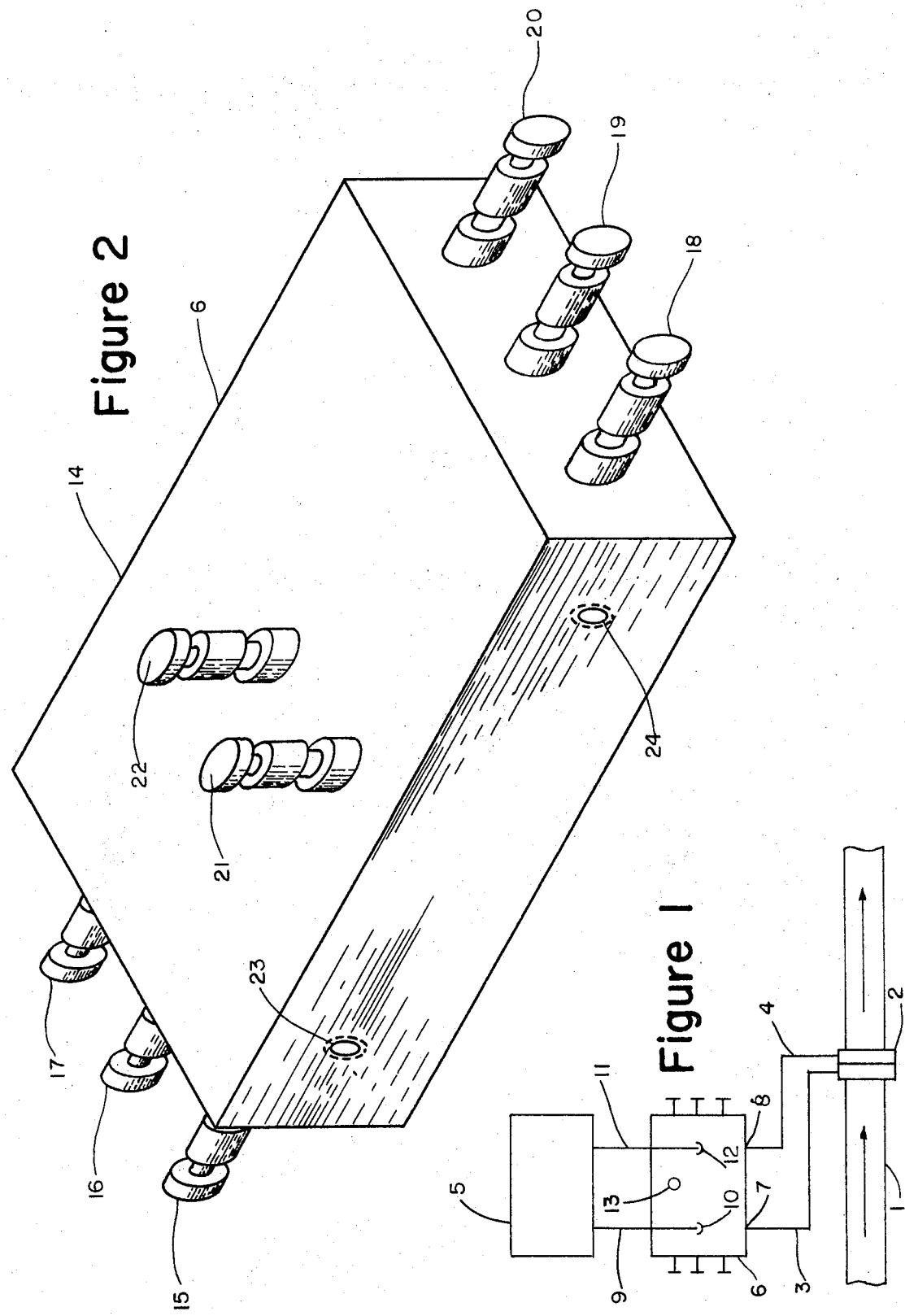

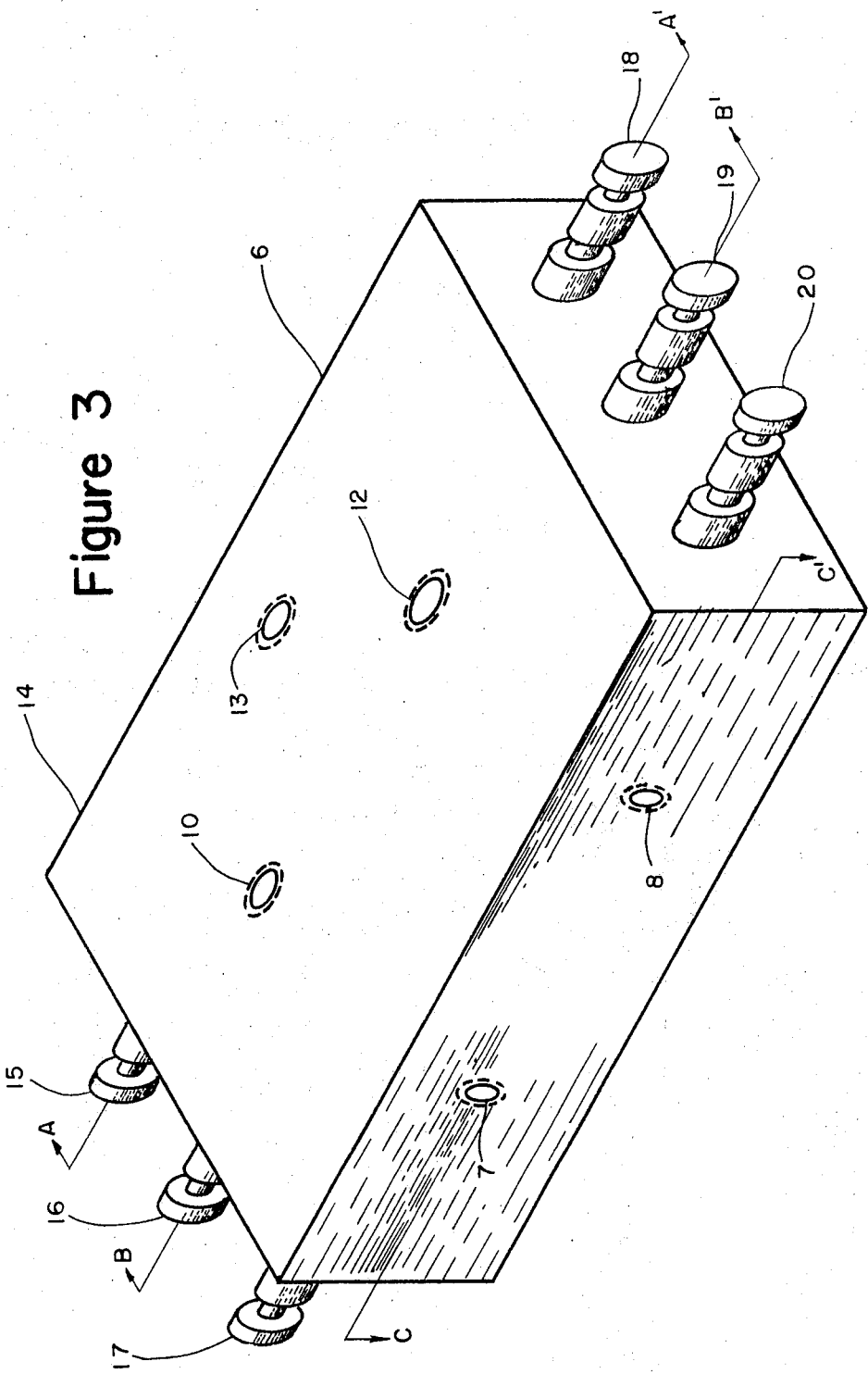

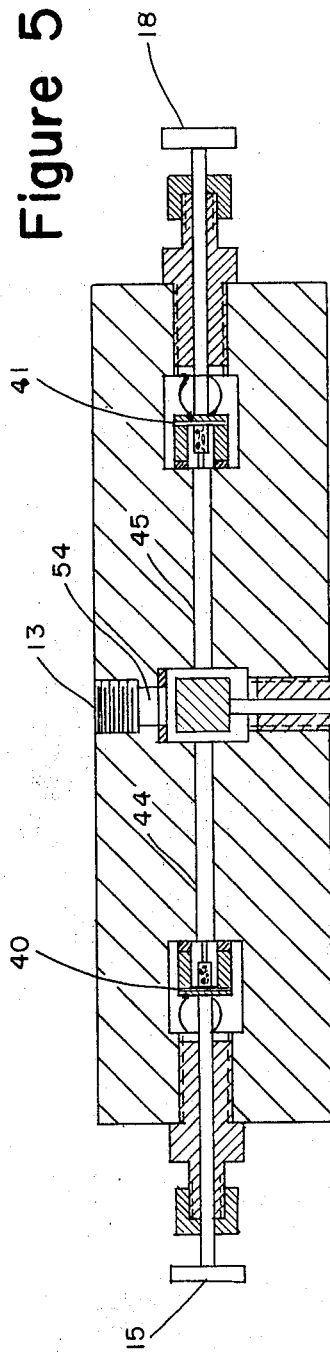
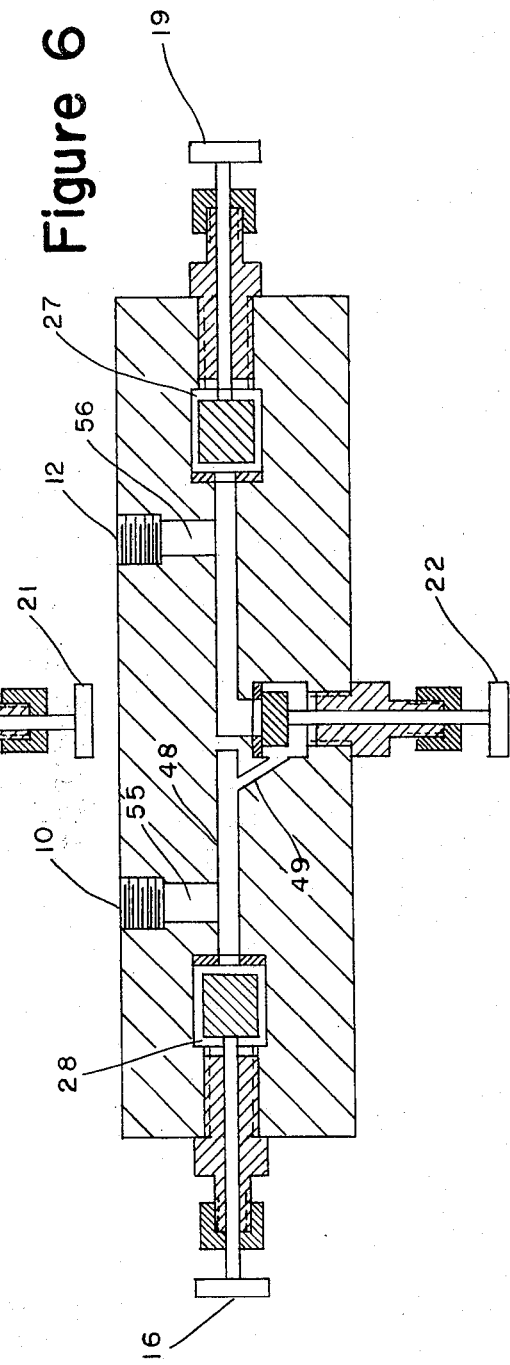

3,768,511

1

CONTROL DEVICE

BACKGROUND OF THE INVENTION

1. Field of the Invention

This invention relates to a control device, sometimes referred to as an instrument manifold, for use in connection with differential pressure instrument measuring devices. More particularly, this invention relates to a device having a high and low pressure side which may be connected to high and low pressure orifice leads from an orifice and to a differential pressure instrument measuring device.

2. Description of the Prior Art

In fluid flow operations, rates of flow are normally measured by orifices. Depending on the direction of flow, a pressure differential is experienced across an orifice, the upstream side experiencing high pressure while the downstream side experiences low pressure. These orifice leads are normally connected to a pressure differential instrument measuring device which is designated to determine rates of flow from the pressure differential experienced across the orifice. Occasionally, due to upsets in the system, the material whose rate of flow is being measured, sometimes hereinafter referred to as process material or process fluid, may find its way into the orifice leads rendering unreliable or unusable pressure readings. In some cases where the upsets are great, the material may find its way into the pressure differential instrument measuring device, causing damage. A control device or instrument manifold for protecting the metering instrument and for clearing the orifice leads of process fluid is needed which is simple, effective and inexpensive. Several artknown devices have been examined, however, such do not provide for the necessary needs. See patents to Adams, U.S. Pat. No. 2,832,221, Tausch, U.S. Pat. No. 3,381,532 and Hodgeman, et al. U.S. Pat. No. 3,105,384.

SUMMARY OF THE INVENTION

A control device has been formed which combines the protective features required and which also facilitates removal of process material from orifice leads. This device is inexpensive and may be quickly removed for replacement or repair. Such control device comprises a housing having a first passage extending from an inlet formed at one side of the housing for communication with a high pressure orifice lead, a second passage extending from an inlet formed at one side of the housing for communication with a low pressure orifice lead, a third and fourth separate passage communicating with said first and second passage, said housing further having passage means extending from the third passage to outlets on the exterior of the housing; means for introducing a pressurized medium into the fourth passage; pressure equalization means interposed in the third passage; valve means integral with said housing and interposed in the first and second passage opposite the third passage, and valve means integral with said housing and interposed in the first and second passage opposite the fourth passage said valve means opposite said fourth passage having control means adapted to allow the passage of pressurized medium having pressure in excess of that in the first and second passage.

The features and advantages of this control device will be apparent from the following description of a presently preferred embodiment of the apparatus of the invention taken in conjunction with the accompanying drawings, where like character references designate like parts throughout the several views.

BRIEF DESCRIPTION OF THE DRAWINGS

FIG. 1 is a simple schematic diagram of the device, the subject of this invention as shown in combination with an orifice and a differential pressure measuring instrument device.

FIG. 2 is a plane view of the front side of this device.

FIG. 3 is a plane view of the back side of this device.

FIG. 5 is a cross-sectional view of this device taken along line A—A of FIG. 3.

FIG. 6 is a cross-sectional view of this device taken along line B—B of FIG. 3.

DESCRIPTION OF THE PREFERRED EMBODIMENTS

Figure 7:
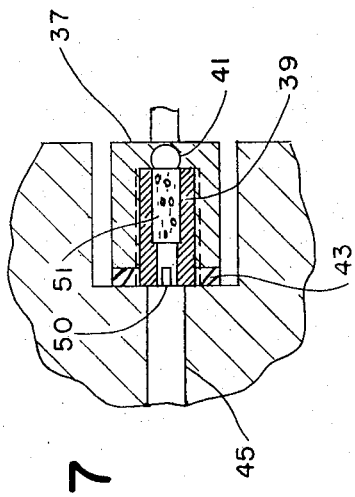
FIG. 7 is an exploded view of a portion of FIG. 4.

Referring now to FIG. 1, fluid material flowing in the direction of the arrow through transfer pipe 1 and through orifice 2, hereinafter referred to as a process orifice. In this configuration, orifice lead 3 will be on the high pressure side of the process orifice, while orifice lead 4 will be on the low pressure side of the process orifice. Usually, to determine the pressure difference across the process orifice and thus determine the rate of flow of the material being measured, a differential pressure measuring instrument device is connected to these leads. Fluid, usually gas, often called "blowback" gas, is exerted against the pressure experienced in the orifice leads in amounts sufficient to prevent the fluid being measured from entering into the instrument. The difference in pressure, as known in the art, is measured by the instrument device 5 which is calibrated to indicate the flow rate of material in pipe 1.

In FIG. 1 there is interposed between the process orifice leads 3 and 4 and the differential pressure measuring instrument device 5 the control device 6, the subject of this invention. High pressure orifice lead 3 enters the device at port opening 7 and low pressure orifice lead 4 enters the device at port 8.

Line 9 from differential pressure measuring instrument 5 is attached to the high pressure side of the control device 6 at port 10. Line 11 from differential pressure measuring instrument device 5 is similarly attached to the low pressure side of the protective device 6 at port 12. Numeral 13 indicates the point on the device where instrument operating fluid such as blowback gas enters the device 6.

Referring now to FIG. 2, numeral 14 refers to the body or housing of the device. Valves 15, 16 and 17 are found on the high pressure side of the control device. Valves 18, 19 and 20 are found on the low pressure side. Valve 21 controls the flow of instrument operating fluid such as air or nitrogen to the control device. Valve 22 regulates the pressure across the control device. Ports 23 and 24 are provided for pressure gages (not shown), which may be attached on the high and low pressure side of the device as a check on the differential pressure measuring instrument device.

Referring now to FIG. 3, numerals 7 and 8 refer to entrance ports to which the high pressure orifice leads and low pressure orifice leads may be attached respectively. Numerals 10 and 12 indicate the ports to which differential pressure measuring instrument device leads 9 and 11 of FIG. 1 may be attached respectively to the control device. Instrument fluid such as air enters control device 6 via port 13.

Figure 4:
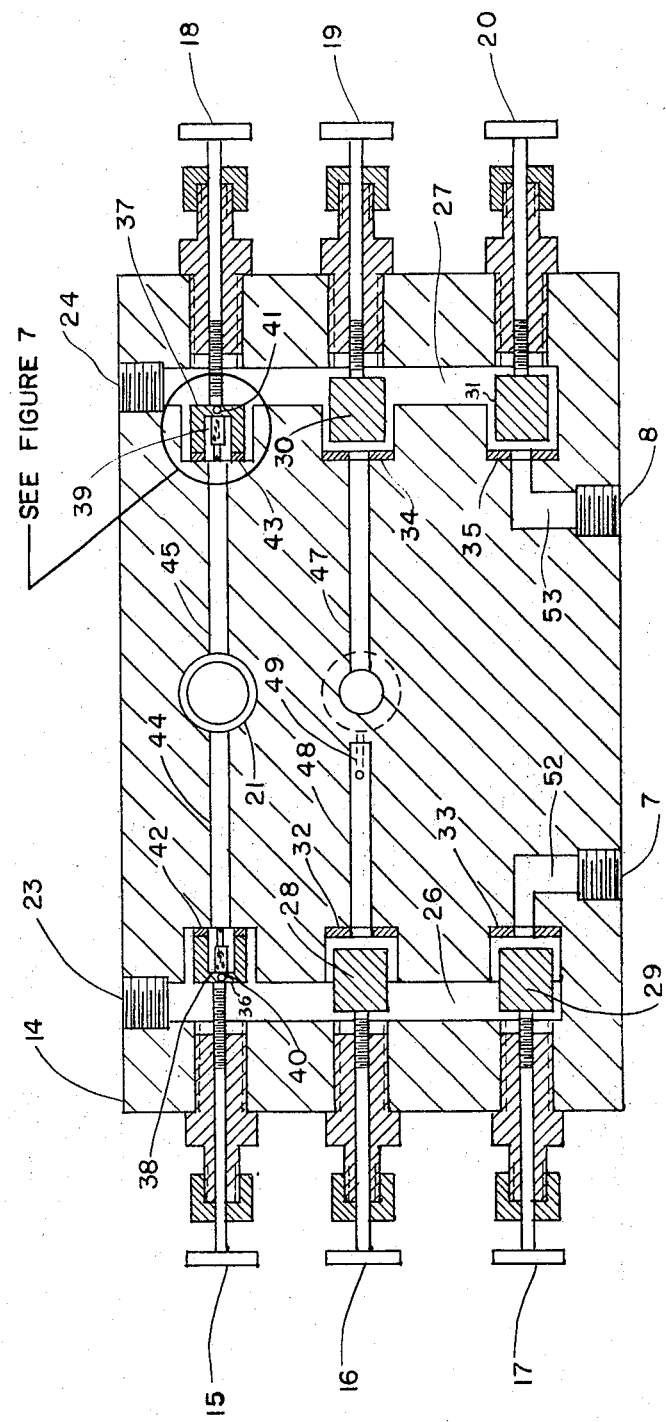
FIG. 4 is a cross-sectional view of the device taken along line C—C of FIG. 3.

Referring now to FIG. 4, orifice lead 3 of FIG. 1 from the high pressure side of the process orifice is attached to the device at port 7. Orifice lead 4 of FIG. 1 from the low pressure side of the process orifice is attached to the device at port 8. Port 7 communicates with passage chamber 26, sometimes hereinafter referred to as the high pressure chamber, and port 8 communicates with passage or chamber 27, sometimes hereinafter referred to as the low pressure chamber, via passages 52 and 53, respectively.

In normal operation, valve 16, 17, 19 and 20 are open as shown. Valves 15 and 18 are closed. Valve plugs 28, 29, 30 and 31 are solid and are designed to seal against valve seats 32, 33, 34 and 35. The valve seats may be metal, but are preferably made from a polymer of tetrafluoroethylene, i.e. tradename, Teflon. Valve plugs 36 and 37 of valves 15 and 18 are not solid, but are specially designed to receive porous metal restrictors 38 and 39. The porous metal restrictors are designed to be inserted into valve plugs 36 and 37 and may be easily removed for cleaning and replacement. At the back of restrictor 38 in valve plug 36 is provided an opening or bleed hole 40 which directly communicates and opens into chamber 26. Also at the back of restrictor 39 in valve plug 37 is provided another opening in bleed hole 41 which directly communicates and opens into chamber 27. Valve seats 42 and 43 are provided directly on valve plugs 36 and 37 for sealing.

In a normal operation instrument operating fluid, e.g. air, nitrogen, is passed in sufficient pressure through valve 21 into passages 44 and 45 respectively. The instrument operating fluid or "blowback gas," then passes through porous restrictors 38 and 39, through bleed holes 40 and 41 into the high and low pressure chambers 26 and 27, respectively, in sufficient quantity to balance the high and low pressure experienced in the orifice leads. The restrictor in valve plugs 36 and 37 provide for precision control of the instrument fluid pressure as such fluid passes through passages 44 and 45 into chamber 26 and 27 respectively.

Instrument fluid under high pressure enters passage 48 and instrument fluid under low pressure enters passage 47 and is then passed on to the pressure differential measuring instrument device as can be more readily seen in FIG. 6.

Plugs 36 and 37 of valves 15 and 18 are adapted to accept commercial orifices and restrictors, preferably porous metal restrictors, as these have been found to give the close control needed to regulate the pressure in the control device. Particularly suitable restrictors are commercially available from the Matt Metallurgical Corp., Farmington, Conn. Plugs 36 and 37 are tapped and screw-threaded to accept this type of restrictor. Although these are most satisfactory, it is seen that any flow restrictor device, such as an orifice, may be inserted into the valve plug. It is within the perview of this invention that valve plug as a unit may be specifically designed to control the air flow from passages 44 and 45.

Referring now to FIG. 5, instrument operating fluid is passed into control device through passage 54 via port 13 from an outside source not shown. Its flow is controlled by valve 21 which under normal operating conditions, is open as shown.

Referring now to FIG. 6, instrument operating fluid under high pressure from high pressure chamber 28 passes into passage 47 and instrument fluid low pressure from low pressure chamber 27 passes into chamber 48. In normal operation, by-pass valve 22 is closed, as shown, thus sealing the low pressure side of the control device from the high pressure side. Passages 55 and 56 extend from passages 48 and 47 to ports 10 and 12, respectively. Ports 10 and 12 are designed to be attached to high and low pressure leads to the pressure differential measuring instrument device 5 as shown in FIG. 1, where actual readings may be obtained. To balance the pressure on both sides of the control device, valve 22 is opened and the instrument fluid pressure equalizes through passage 49.

FIG. 7 is an exploded view of plug 37 as shown in FIG. 4. In normal operations, instrument operating fluid from passage 45 passes into restrictor 39 via passage 50, through porous material 51 and then to bleed hole 41 which communicates with low pressure chamber 27. Valve plug 36 has the same configuration of elements.

The control device, the subject of this invention, has several unique features. It is a safety device in that when an unbalanced condition is experienced and process material which is being measured in line 1 of FIG. 1 is forced into orifice leads 3 and 4, it is less likely with the control device interposed between the orifice in line 1 and instrument measuring device 5 that process material will be forced into measuring device 5, causing damage.

As is more often likely, an unbalanced condition may occur in the system transferring the process fluid in which process material may be forced into orifice leads 3 and 4. These leads must be cleared before normal operation may be resumed, and reliable readings may be obtained. The control device, the subject of this invention, provides for a method of removal of this material. In this condition, valves 16 and 19 would be closed, valves 17 and 20 opened, and vavles 15 and 18 opened to allow for full instrument operating fluid to flow through the device and through leads 3 and 4, thus clearing any material that may be present in the control device or in the process orifice leads.

Valves 17 and 20 facilitate the quick removal and replacement of the control device in the instrumentation system. When, for example, the control device is not operated or when, for example, instrument fluid is not available, the system may be cut off without harm to any of its parts simply by closing valves 17, 20 and 21. Valves 17 and 20 may be located in orifice leads 3 and 4, but are preferably included in the body of the control device.

It will be seen that in the device as illustrated, manual valves have been used in the control device, the subject of this invention. This is, however, in no way to be construed as a limitation on this invention or the claims appended. It is well within the perview of this invention to use automated valves in place of manual devices shown.

While a presently preferred embodiment of the invention is given for the purpose of disclosure, numerous changes in details of construction and arrangement of parts can be made which will readily suggest themselves to those skilled in the art and which are encompassed within the spirit of the invention and the scope of the appended claims.

I claim:

1. A control device comprising:
   a. A housing having a first passage extending from an inlet formed at one side of the housing for communication with a high pressure orifice lead, a second passage extending from an inlet formed at one side of the housing for communication with a low pressure orifice lead, a third and fourth separate passage communicating with said first and second passage, said housing further having passage means extending from the third passage to outlets on the exterior of the housing;
   b. Means for introducing a pressurized medium into the fourth passage;
   c. Pressure equalization means interposed in the third passage;
   d. Valve means integral with said housing and interposed in the first and second passage opposite the third passage, and
   e. Valve means integral with said housing and interposed in the first and second passage opposite the fourth passage, said valve means opposite said fourth passage having control means adapted to allow the passage of pressurized medium having pressure in excess of that in the first and second passage.

2. A control device as in claim 1 wherein the control means adapted to allow the passage of pressurized medium comprises:
   a. A valve plug having an interior chamber open at one end of said plug and a passage located at the other end of said interior chamber communicating with said interior chamber and extending through the valve plug to an outlet on the outside of said valve plug; and
   b. Pressure regulating means adapted for close engagement with the interior chamber of the valve plug.

3. A control device as in claim 2 wherein the pressure regulating means is an orifice.

4. A control device as in claim 2 wherein the pressure regulating means is a porous metal restrictor.

5. A control device as in claim 4 wherein the pressure equalization means interposed in the third passage is a by-pass valve.

6. A control device as in claim 5 wherein the passage means extending from the third passage to outlets in the exterior of the housing comprises two passages, one located on one side of the by-pass valve and the other passage located on the other side of the by-pass valve.

7. A control device as in claim 6 wherein the means for introducing a pressurized medium into the fourth passage comprises:
   a. A passage extending from an inlet for pressurized medium on one side of the housing to the fourth passage.
   b. Valve means interposed in the fourth passage opposite said passage and adapted to control the flow of pressurized medium into the control device.

8. A control device as in claim 7 wherein said housing containes in addition valve means integral with said housing interposed in the first and second passage between the inlets and the fourth passage designed to seal said inlets from the first and second passage.

9. A control device as in claim 8 wherein all valve means have valve seals made of a polymer of tetrafluorethylene.

10. A control device as in claim 9 wherein pressure gauges are located in the first and second chamber.

11. A control device as in claim 10 wherein valve means are manually operated type valve means.

* * * * *